US012729819B1

(12) United States Patent
Mishra et al.

(10) Patent No.: US 12,729,819 B1
(45) Date of Patent: Sep. 8, 2026

(54) STREET LIGHT AUTOMATED ENERGY CONSERVATION METHOD

(71) Applicants: Aarush Mishra, Novi, MI (US); Rishan Malladi, Novi, MI (US); Erik Shaska, Northville, MI (US)

(72) Inventors: Aarush Mishra, Novi, MI (US); Rishan Malladi, Novi, MI (US); Erik Shaska, Northville, MI (US)

( * ) Notice: Subject to any disclaimer, the term of this patent is extended or adjusted under 35 U.S.C. 154(b) by 0 days.

(21) Appl. No.: 19/171,624

(22) Filed: Apr. 7, 2025

(51) Int. Cl.
*F21S 6/00* (2006.01)
*F21V 23/04* (2006.01)
*F21W 131/103* (2006.01)

(52) U.S. Cl.
CPC .......... *F21S 6/005* (2013.01); *F21V 23/0464* (2013.01); *F21V 23/0471* (2013.01); *F21W 2131/103* (2013.01)

(58) Field of Classification Search
CPC .......... F21W 2131/103; F21V 23/0471; F21V 23/0464; F21S 6/005
See application file for complete search history.

(56) References Cited

U.S. PATENT DOCUMENTS

| | | | | |
|---|---|---|---|---|
| 8,461,778 | B2 * | 6/2013 | Mohan | H05B 47/115<br>315/307 |
| 8,931,919 | B2 * | 1/2015 | Rami | F21V 23/04<br>362/240 |
| 9,210,759 | B2 * | 12/2015 | Reed | H05B 47/1985 |
| 9,961,750 | B2 * | 5/2018 | Leinen | H05B 47/19 |
| 10,440,801 | B1 * | 10/2019 | Wagner | G01V 8/10 |
| 10,499,477 | B2 * | 12/2019 | Chen | G06Q 10/063 |
| 10,601,244 | B2 * | 3/2020 | Recker | H02J 9/065 |
| 2007/0273500 | A1 * | 11/2007 | Chiu | H05B 47/19<br>362/276 |
| 2009/0154146 | A1 * | 6/2009 | Wang | H05B 47/13<br>362/153.1 |
| 2012/0037725 | A1 * | 2/2012 | Verfuerth | A01G 25/16<br>239/289 |
| 2012/0038490 | A1 * | 2/2012 | Verfuerth | G08G 1/0133<br>340/917 |
| 2015/0216019 | A1 * | 7/2015 | Verfuerth | H05B 47/19<br>315/153 |
| 2016/0286627 | A1 * | 9/2016 | Chen | G06Q 50/26 |

* cited by examiner

*Primary Examiner* — Leah Macchiarolo
(74) *Attorney, Agent, or Firm* — Clark Hill PLC; John S. Paniaguas

(57) ABSTRACT

The present invention relates to a street light automated energy conservation method. The smart street lighting system is configured so that one or more of the street lights automatically illuminate when vehicles are in the range of a street light that automatically turns off during periods of no traffic, providing significant energy savings while maintaining public safety. Each street light is mounted on a pole adjacent the roadway.

4 Claims, 1 Drawing Sheet

STREET LIGHT AUTOMATED ENERGY CONSERVATION METHOD

BACKGROUND OF THE INVENTION

1. Field of the Invention

The present invention relates to a street lighting automated energy conservation system and method that automatically illuminates street lights when vehicles pass by and turns off during periods of no traffic, providing significant energy savings while maintaining public safety.

2. Description of the Prior Art

There are an estimated 26 million street lights in the in the United States, consuming as much electricity annually estimated as 1.9 million households and generating greenhouse gas emissions equivalent to an estimated 2.6 million cars. The municipalities generally cover the cost of the electricity to operate street lights located on municipal property, such as roadways. The cost of electricity for street lights located on private property, for example, shopping malls, are paid for by the property owner.

Metering of the street lights is normally segregated by the organization responsible for payment of the electricity usage. Thus, street lights for which the municipalities are responsible for electricity usage are metered separately from electricity usage by private property owners.

Municipalities are known to build the costs of such electricity usage for the street lights into local municipal taxes while private land owners cover the cost by incorporating such cost into mall lease costs.

Photocells are known to be used with street lights both in municipal operated street lights and street lights operated on private property. Such photocells automatically turn the street lights on at night and automatically turn the street lights off in the daytime, thus conserving energy usage.

Other ways of reducing the energy usage can also be used, for example, increasing the spacing between light poles. However, for existing roadway light systems that are equipped with independent photocells, selected photocells can be removed or disabled so that selected street lights are non-operable, thereby reducing the overall power consumption of a roadway lighting system. These solutions may be impractical for existing roadway light systems and can result in dark spots in the roadway at night that may affect public safety. However, sparsely used streets are known to waste a significant amount of energy when the light sensors are at or above their trigger level because the light sensors will keep the street lights on irrespective of vehicle traffic or lack thereof.

SUMMARY OF THE INVENTION

Briefly, the present invention relates to a street light automated energy conservation system and method. The smart street lighting system is configured so that one or more of the street lights automatically illuminate when vehicles are in the range of a street light that automatically turns off during periods of no traffic, providing significant energy savings while maintaining public safety. Each street light is mounted on a pole adjacent the roadway.

DESCRIPTION OF THE DRAWING

These and other advantages of the present invention will be readily understood with reference to the following specification and attached drawing, wherein.

DETAILED DESCRIPTION

The present invention is smart street light energy conservation system that automatically illuminates one or more street lights to illuminates in low ambient light levels when vehicles pass by and turns off during periods of no vehicle or other traffic, providing significant energy savings while maintaining public safety.

Figure 1A:
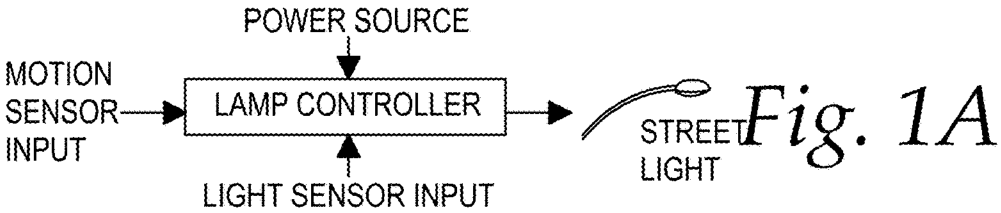
FIG. 1A illustrates a simplified block diagram of a first exemplary embodiment of the invention.
Figure 2A:
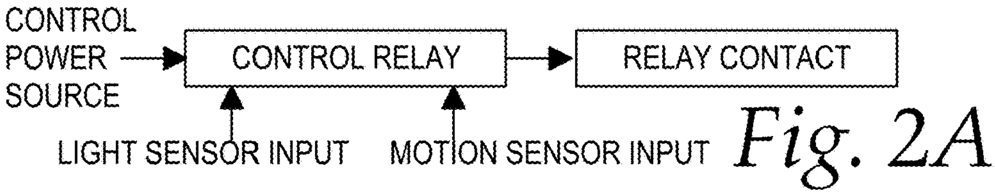
FIG. 2A illustrates a simplified block diagram of another embodiment of the invention illustrating a simplified control circuit.
Figure 2B:
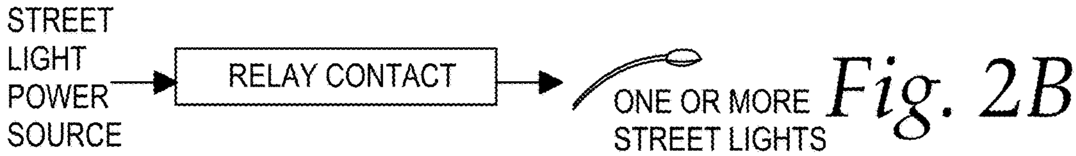
FIG. 2B illustrates a simplified block diagram of the embodiment illustrated in FIG. 2A illustrating a simplified power circuit.
Figure 1B:
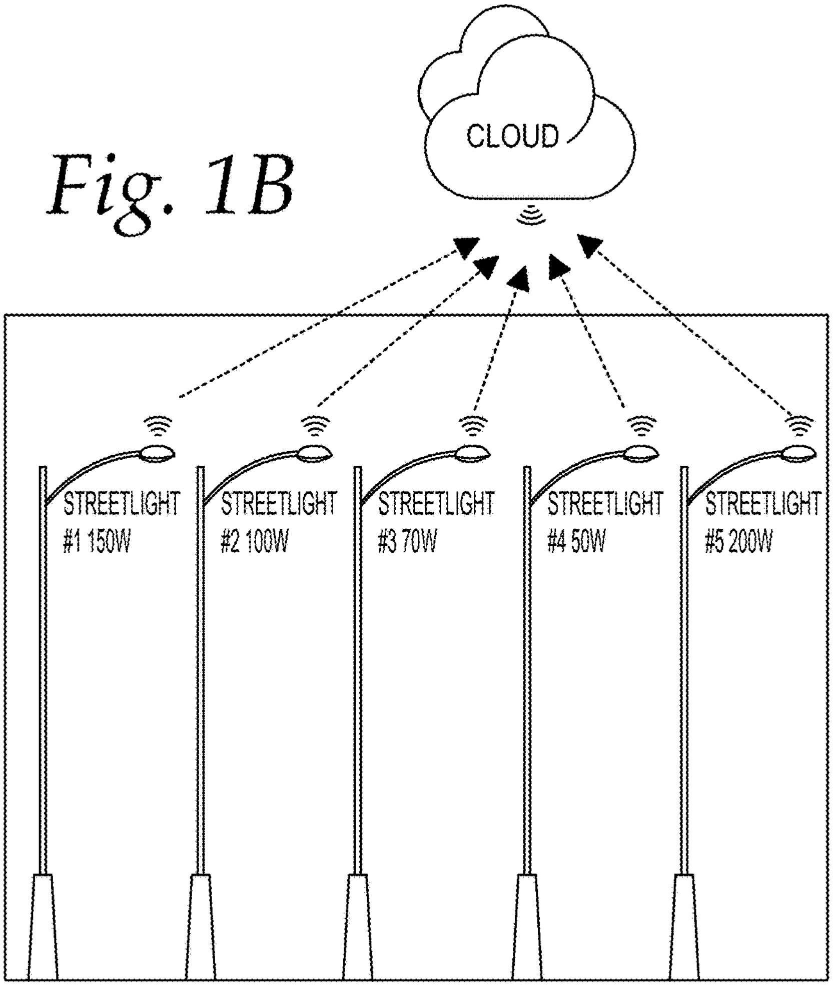
FIG. 1B illustrates a number of street lights located along a roadway, each equipped with sensors in accordance with the present invention illustrating remote communication over the air waves with the cloud.

Two embodiments of the invention are disclosed. FIGS. 1A and 1B illustrates a first embodiment while FIGS. 2A and 2B illustrate second embodiment. Both embodiments are responsive to inputs from a light sensor and motion sensor so that the street lights are only illuminated during low light conditions in response to vehicle or pedestrian traffic.

The first embodiment an integrated embodiment of the invention in which the street lights are individually and independently controlled by a luminaire controller which receives inputs from a motion detector and a light sensor. As best shown best in FIG. 1B, this embodiment requires a lamp controller which is provided for each street light. The embodiment illustrated in FIGS. 1A and 1B may be remotely programmable by way of the cloud, as shown in FIG. 1B, for example, in a similar manner as iPhones are remotely programmed with software updates.

The sensor disclosed in FIGS. 2A and 2B illustrates an embodiment in which one or more street light may be indirectly controlled by way of discrete sensors; namely, a motion detector sensor and light sensor, i.e without luminaire controllers. In this embodiment, the power source may be indirectly connected to the light source by way of a control relay contact as shown in FIG. 2. The control relay contact is responsive to a control relay FIG. 2B. The control relay is actuated by signals from the motion detector and the light sensor. When both sensors indicate motion and light level less than a predetermined level, the control relay is actuated and generates a TURN ON signal, thereby turning on 1 or more street lights that are connected to the street light power source. When the motion drops below predetermined and/or the light level drops below a predetermined level indicative the control relay drops out.

The street lights for both embodiments may be carried by light poles 22 that carry the street lights from 15 to 40 feet from the ground and are spaced apart, for example, 80 to 100 feet apart. The light poles 22 are generally located adjacent a roadway and securely mounted.

The light poles 22 illustrated in FIG. 1A may be formed with an access panel for controller installation and include Internal wiring pathways, mounting brackets and hardware. The embodiment illustrated in FIGS. 2A and 2B may be mounted on light poles without an access panel with the components and wire connections mounted in junction boxes, for example, secured to the light pole.

Exemplary components for the invention illustrated in FIG. 1A may be comprised of the exemplary core components as set forth below.

Core Components
- Controller
- FRE-220-P-L LoRaWAN Luminaire
- Controller
  - Installed inside the lamp post through an access panel
  - Processes inputs from sensors and controls light activation
  - IP66 rated for weather resistance
- Light Sensor (Photocell)
  - A+ Capable photocell series: DLL127, DLL127F, DLL347, DLL347F, DLL480, DLL480F
  - Twist-lock style with weatherproof housing for fixture attachment
  - Detects ambient light levels to determine day/night
  - Prevents lights from activating during daylight hours
  - Commercial-Grade Light Sensor - - - Acuity Brands DLL127F 1.5 FC
  - photocell (light sensor) to detect ambient light levels industry standard in municipal street lighting
  - Twist lock NEMA socket compatible precision calibrated
  - Fail-safe design (defaults to "on" if component
  - Weather-sealed for outdoor durability
  - 5-year minimum lifespan
  - Surge protection built-in
  - Compatible with LED lighting systems
- Motion Sensor
  - Specifically designed for Roadways, Bridges, Tunnels, and Parking applications
  - Available in multiple voltage ratings (120V, 347V, 480V)
  - IP54 rated for outdoor installation
  - Adjustable time and sensitivity settings
  - Can differentiate between vehicles and smaller movements
  - can mounts directly to poles or walls
  - Operating temperature range: −20° C. to +50° C.
  - Connects with standard control including LoRaWAN controllers Obviously, many modifications and variations of the present invention are possible considering the above teachings. Thus, it is to be understood that within the scope of the appended claims, the invention may be practiced otherwise than as specifically described above.

What is claimed and desired to be secured by a Letters Patent of the United States is:

We claim:

1. A street light energy conservation system for conserving energy in a single street light comprising:

a light sensor for sensing ambient light levels adjacent said street light;

a motion sensor for sensing motion along a roadway adjacent said street light, said motion sensor independent of said ambient light level sensor; and a control system for independently and alternatively connecting and disconnecting a single street light from a power source which includes a control system which includes a control relay and a cooperating relay contact, said control relay operably connected to a control power source and is responsive to said light sensor and said motion detector, wherein said control relay closes the cooperating relay contact when the ambient light level is below a predetermined threshold and motion is detected by the motion sensor to turn on said street light, and alternatively opens the cooperating relay contact when the ambient light exceeds the threshold hold or no motion is detected.

2. The street light energy conservation system as recited in claim 1, wherein said control system includes a street light that is remotely programmable.

3. The street light energy conservation system as recited in claim 2, wherein said control system is configured to communicate with the cloud.

4. The street light energy conservation system as recited in claim 1 further including a light pole for carrying said street light, said light pole formed with an access panel for carrying said control system.

* * * * *